(12) United States Patent
Schulz

(10) Patent No.: US 7,843,199 B2
(45) Date of Patent: Nov. 30, 2010

(54) LEVEL METER

(75) Inventor: Dirk Schulz, Krefeld (DE)

(73) Assignee: Krohne S.A., Romans-Cedex (FR)

(*) Notice: Subject to any disclaimer, the term of this patent is extended or adjusted under 35 U.S.C. 154(b) by 166 days.

(21) Appl. No.: 12/018,936

(22) Filed: Jan. 24, 2008

(65) Prior Publication Data
US 2008/0210003 A1 Sep. 4, 2008

(30) Foreign Application Priority Data
Jan. 31, 2007 (DE) .................. 10 2007 005 619

(51) Int. Cl.
*G01F 23/30* (2006.01)
*G01F 23/56* (2006.01)

(52) U.S. Cl. .................. 324/644; 73/306; 73/319

(58) Field of Classification Search .......... 324/600, 324/644, 306, 319
See application file for complete search history.

(56) References Cited

U.S. PATENT DOCUMENTS

| | | | |
|---|---|---|---|
| 4,879,910 A | 11/1989 | Lew | |
| 5,090,253 A | 2/1992 | Kolpak | |
| 5,230,254 A | 7/1993 | Craft | |
| 5,457,990 A * | 10/1995 | Oswald et al. | 73/290 V |
| 5,969,564 A | 10/1999 | Komatsu et al. | |
| 6,266,022 B1 * | 7/2001 | Muller et al. | 343/703 |
| 2004/0140814 A1 * | 7/2004 | Bletz et al. | 324/644 |
| 2006/0016273 A1 | 1/2006 | Bitto et al. | |

FOREIGN PATENT DOCUMENTS

| | | |
|---|---|---|
| DE | 3503841 | 8/1996 |
| EP | 0119638 | 9/1984 |
| EP | 1126251 A2 * | 8/2001 |
| WO | WO 96/08697 | 3/1996 |
| WO | WO 2006/091199 | 8/2006 |

* cited by examiner

*Primary Examiner*—Timothy J Dole
*Assistant Examiner*—Farhana Hoque
(74) *Attorney, Agent, or Firm*—Cesari and McKenna, LLP; John F. McKenna

(57) ABSTRACT

A level meter for measuring the fill level of a medium in a vessel, includes a reference container that can be connected to the vessel in a manner whereby the level in the reference container is identical to that in the vessel. The reference container is provided with an adapter unit for a microwave level meter operating by the radar principle which adapter unit encompasses an injection device for coupling-in a microwave signal. This constitutes a low-cost solution for connecting a microwave level meter to a reference container, ensuring optimized signal injection.

9 Claims, 3 Drawing Sheets

LEVEL METER

BACKGROUND OF THE INVENTION

This invention relates to a level meter for measuring the level of a medium in a vessel, equipped with a reference container that can be connected to the vessel in a manner whereby the level in the reference container is identical to the level in the vessel, which reference container features an adapter unit for a microwave level meter that operates by the radar principle. A level meter of this type has been described earlier for instance in EP 1 126 251 A2.

FIELD OF THE INVENTION

Industrial operations often require the determination of the level to which a vessel such as a tank is filled with a medium, often a liquid. This has been accomplished by different techniques, differentiated between contact level measuring and non-contact level measuring methods.

Examples of contact level measuring methods whereby a component of the measuring device touches the medium whose level is to be measured, employ, for instance, a float or a feeler plate. Contact level measuring methods also include capacitive measurements by detecting the level-dependent capacity between an electrode immersed in the medium and the wall of the vessel, or thermal measurements in which the augmented heat dissipation resulting from the immersion of a current-carrying, temperature-dependent resistance in the medium is used as an indicator based on the fact that the electric resistance changes with the depth of immersion.

The non-contact level measuring methods include measurements, for instance, by laser beams or ultrasound. In this case, a laser or ultrasonic signal is emitted, reflected off the surface of the medium, the reflected signal is captured and provides information on the fill level of the medium based on the signal runtime. The same principle serves as a basis for radar level measuring techniques, in which case a microwave signal is generated, transmitted in the direction of the medium whose level is to be measured, reflected off the surface of the medium and recaptured.

There are different radar-based level-measuring techniques:

In pulsed radar level-measuring techniques, short microwave signal pulses are emitted either unmodulated or carrier-frequency-modulated. The runtime of the microwave pulses from the transmitter to the surface of the medium and back to the receiver serves as a measure of the distance between the transceiver and the medium.

In frequency modulated continuous wave (FMCW) radar-based level measurements, the microwave signal is applied in continuous fashion but the frequency is modulated, typically with consecutive ramping. The delay time during the signal propagation causes the transmitted frequency to change by the time the reflected signal is received, with the frequency differential permitting a determination of the distance from the reflecting surface and thus of the level of the medium.

Finally, there is the time domain reflectometry (TDR) radar-based level measuring method which is similar to the pulsed radar level measuring technique except that it generally employs line-guided waves, i.e. electric pulses without a carrier frequency.

In large vessels, and especially when these vessels are being filled or when liquid is drawn, the surface of the medium is often unsteady, i.e. uneven. For that reason but also because of possible built-in structures within the vessel, level meters have been designed that use a reference container. The reference container connects to the vessel in a way whereby the level in the reference container is identical to the level in the vessel that serves as the actual reservoir. These reference containers, often referred to as bypass units, generally connect to the vessel via pipe joints in the upper and lower sections, allowing the medium to flow into the reference container. The reference container is usually in the form of a pipe with a significantly smaller diameter than the diameter of the vessel serving as the actual reservoir. The result is a substantially calmer surface of the medium, permitting correspondingly stable and more accurate level measurements.

THE PRIOR ART

When in level measurements a microwave level meter is used for a reference container of that type, the microwave signal must be coupled into the reference container. DE 100 60 068 C1, for example, describes the general concept of injecting a microwave signal, generated by a microwave source, into a vessel. EP 1 126 251 A2, mentioned above, addresses the coupling in the specific case in which a reference container is used. What all the solutions discussed therein have in common is that the microwave signal injection device is detachably connected to the reference container, usually screwed or flanged to the latter. Generally, however, the result is a less than ideal microwave propagation, apart from the extra cost of a screw or flange connection.

SUMMARY OF THE INVENTION

It is therefore the objective of this invention to introduce a cost-effective solution for connecting a microwave level meter to a reference container in a way as to ensure optimal signal injection.

For a level meter as first above described, this objective is achieved in that the adapter unit between the reference container and the microwave level meter already comprises a microwave-signal injection device.

Thus, according to the invention, the reference container to which a microwave level meter is to be connected already "comes with" its own microwave-signal injection device. This permits optimized microwave-specific adaptation to the geometry of the reference container. Moreover, it is a low-cost solution since it obviates the need for additional, complex connecting hardware for the microwave level meter. Instead, the microwave level meter can be set, in simple fashion, on the adapter unit and clamped to the latter by simple means.

Specifically, in one preferred embodiment of the invention, the injection device doubles as the sealing element of the reference container. In other words, no additional sealing provisions are needed. Instead, in this preferred embodiment of the invention, the very injection device provided on the reference container serves to seal off the latter.

In this context, one preferred embodiment of the invention provides for the reference container to be pressure-sealed by the injection device. With far less mechanical complexity and, consequently, with significant cost savings, this results in conditions which to date have been attainable essentially by means of pressure-sealed flange connections only.

In a specific, preferred implementation of the invention, the injection device is firmly attached to the reference container. One preferred design variation of the invention provides for the injection device to be welded to the reference container. Preferably, then, the injection device and the reference container are designed as one integral unit.

In one preferred design variation according to the invention, the injection device additionally features a microwave window. Preferably, the injection device includes an impedance matching unit. Most desirably, the microwave window is built into the impedance matching unit.

In general, there are various possible ways to connect the reference container to the injection device. However, in a particularly preferred embodiment of the invention, the reference container is provided with a tubular conduit section for connection to the injection device and the impedance matching unit ensures a progressive transition from the diameter of the microwave window to the diameter of the tubular conduit section. Also, impedance matching is obtainable by an appropriate configuration of the microwave window itself or by attaching to it a suitable adapter as has already been employed in the prior art.

Basically, for level measurements, the reference container does not have to be equipped with more than the microwave level meter. According to a preferred embodiment of the invention, however, the reference container comprises an additional level meter. As a particularly preferred provision, that additional level meter is a magnetic level meter with a float. As the underlying operating principle of such a level meter, the position of the float intrinsically indicates the height of the level in the reference container and a magnetic device on the float signals that position to a point outside the reference container where a display element, itself equipped with a magnetic device, is located. A glimpse at the reference container allows the user of the level meter to quickly note the level of the medium in the vessel.

BRIEF DESCRIPTION OF THE DRAWINGS

The following description of preferred embodiments will explain this invention in more detail with reference to the attached drawings, in which.

DETAILED DESCRIPTION OF PREFERRED EMBODIMENTS

Figure 1:
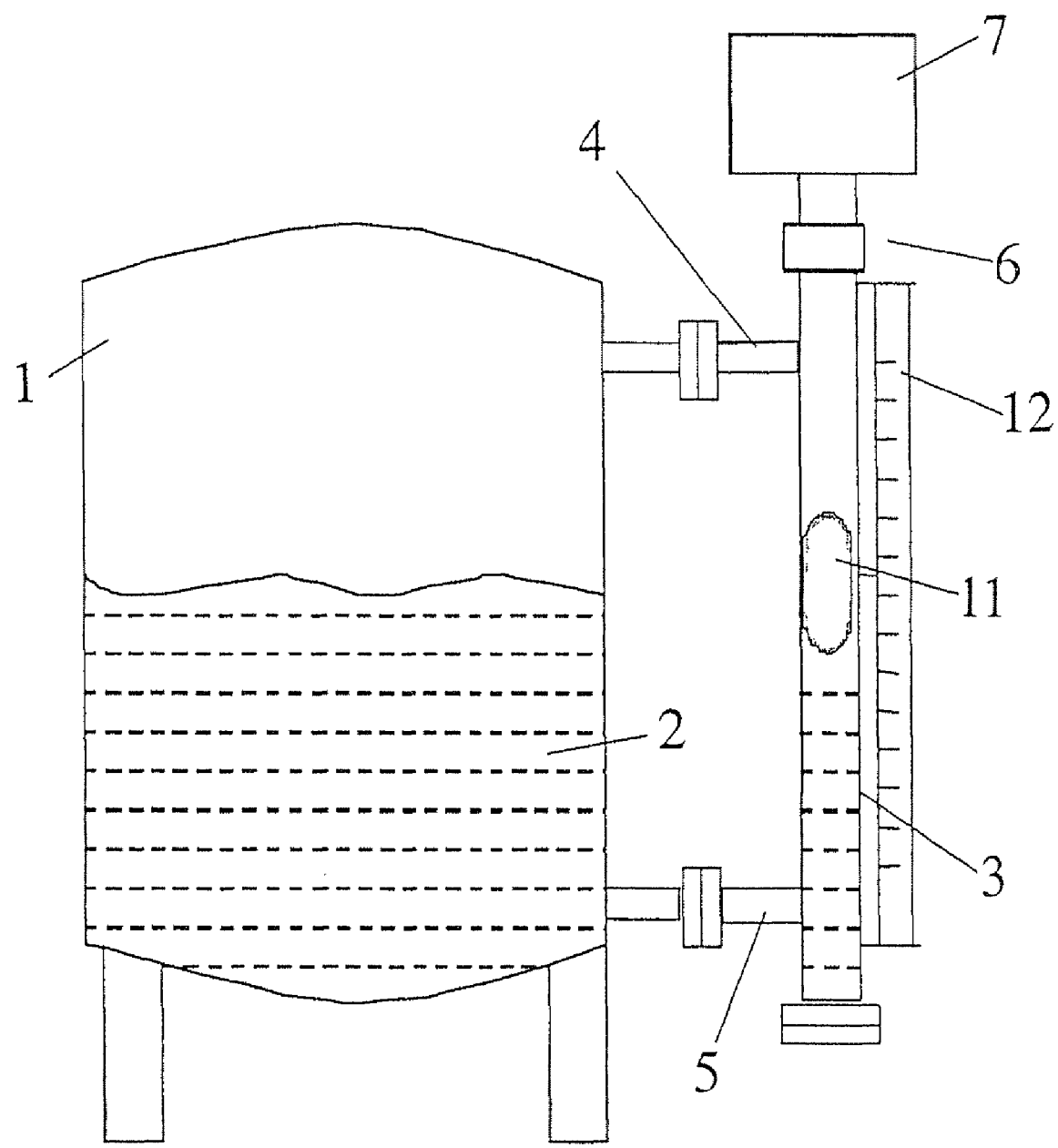
FIG. 1 is a schematic illustration of a level meter according to a first preferred embodiment of the invention.

Schematically illustrated in FIG. 1 is a level meter according to a first preferred embodiment of the invention, by means of which the level of a medium 2 in the vessel 1 is to be determined. To that effect, a reference container 3 is provided which can be linked to the vessel 1 via tubular connectors 4 and 5, respectively. In this fashion, the level of the medium 2 will be the same in the reference container 3 as in the vessel 1. The reference container 3, however, is of a significantly smaller diameter than the vessel 1, resulting in a calmer surface of the medium 2 in the reference container 3 and thus in the improved measuring accuracy of a microwave level meter.

Figure 2:
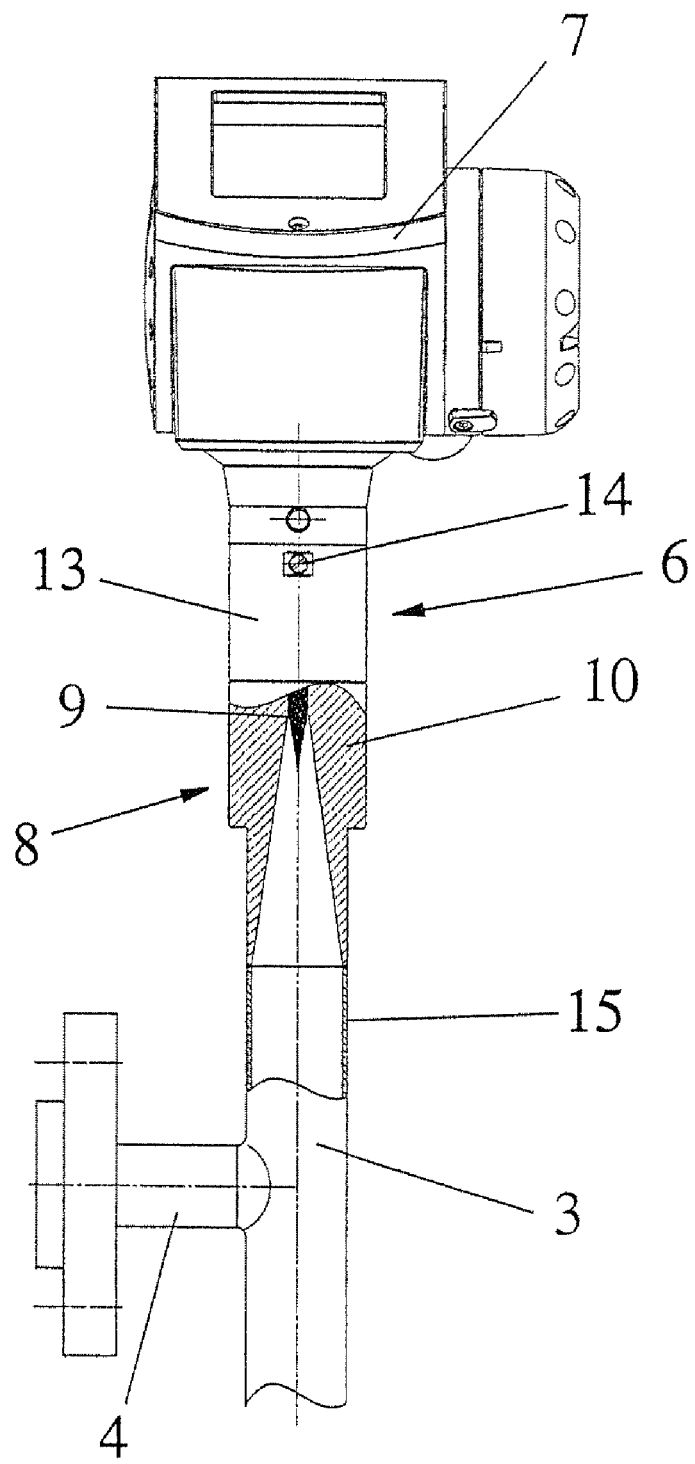
FIG. 2 is a detail drawing, partly sectional, of the level meter according to the first preferred embodiment of the invention.

For such microwave-based level measurements, a microwave level meter 7, employing the radar principle, is provided and linked to the reference container 3 via an adapter unit 6. As an important feature, the adapter unit 6 incorporates an injection device 8, shown in FIG. 2, for coupling-in a microwave signal. This injection device 8 includes a microwave window 9 and an impedance matching unit 10. For the impedance matching function, the microwave window 9 is configured as depicted in FIG. 2 and is built into the impedance matching unit 10. In terms of the shape, material and mounting of the microwave window 9 in the impedance matching unit 10, essentially any prior-art solution can be employed.

As shown in FIG. 1, in addition to the microwave measuring function, the reference container 3 comprises an additional level measuring capability employing a float 11. The latter is provided with magnetic devices, not illustrated, by means of which the level of the medium 2 in the reference container 3 can be signaled to an external scale 12 where it can be read out. With this first preferred embodiment of the invention as described above, a simple glimpse at the scale 12 enables a user of the level meter to determine the basic status of the level in the reference container 3 and thus in the vessel 1 as well. If the exact level of the medium 2 is of interest, that level, detected via the microwave level measurement, may be read out for instance digitally from a display unit, not illustrated. Additionally, it is possible to electronically transmit the level information, acquired in the microwave level measurement, for further processing.

As can also be seen in FIG. 2, the injection device 8 of the adapter unit 6 functions as a sealing element for the reference container 3. The injection device 8 thus closes the reference container 3 in pressure-sealed fashion. In the case illustrated, this is accomplished by solidly connecting the injection device 8 with the reference container 3, i.e. by welding it to the latter. That allows the microwave level meter 9 to be simply set on top of the reference container 3 and to be clamped to it by means of a simple fastening device 13 with merely a small screw 14. No further sealing function is required.

Moreover, in microwave-specific terms, the configuration of the level meter of the first preferred embodiment of the invention described above ensures a virtually ideal adaptation of the transmission of the microwave signal generated in the level meter 7 into the reference container 3. A potential adaptive error due to unknown or varying geometries of whichever reference container 3 is employed can thus be eliminated.

Figure 3:
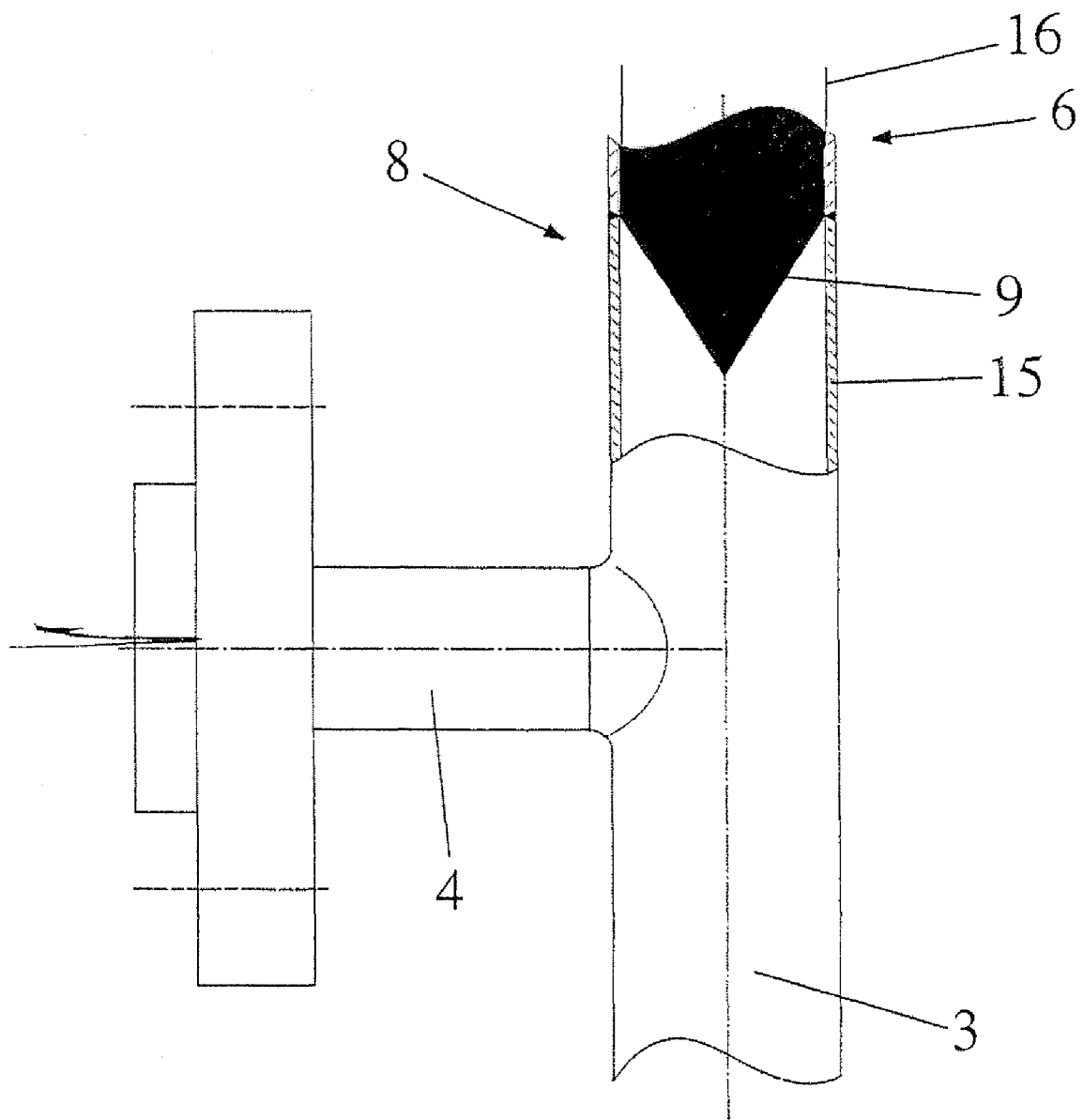
FIG. 3 is an illustration, partly sectional, of a second preferred embodiment of a level meter according to the invention.

While in the first preferred embodiment of the invention, shown in FIGS. 1 and 2, there is a progressive transition from the diameter of the microwave window 9 to the diameter of the tubular conduit section 15 of the reference container 3 serving to connect it to the injection device 8, FIG. 3 depicts a configuration in which the diameter of the waveguide 16 that conducts the microwave signal from the microwave level meter 7 to the reference container 3 already matches the diameter of the reference container 3. Therefore, an antenna-like flared design is not needed since the microwave signal follows an ideal path. As in the first preferred embodiment of the invention, the microwave window 9 again functions as a hermetic sealing element for the reference container 3 which, as explained further above, constitutes a low-cost solution compared to the traditional screw and flange connection that would otherwise have to ensure the necessary seal.

The invention claimed is:

1. A level meter for measuring the fill level of a medium in a vessel, with a reference container that can be connected to the vessel in a manner whereby the level in the reference container is identical to that in the vessel, while the reference container is provided with an adapter unit for a microwave level meter operating by the radar principle, wherein the adapter unit incorporates a microwave-signal injection device comprising an impedance matching unit and a microwave window is built into the impedance matching unit.

2. The level meter as in claim 1, wherein the injection device functions as a sealing element for the reference container.

3. The level meter as in claim 2, wherein the reference container is pressure-sealed by means of the injection device.

4. The level meter as in one of the claims 1 to 3, wherein the injection device is solidly connected to the reference container.

5. The level meter as in claim 4, wherein the injection device constitutes a single integral unit with the reference container.

6. The level meter as in claim 1, wherein the reference container is provided with a tubular conduit section connecting it to the injection device, and the impedance matching unit is designed to ensure a progressive transition from the diameter of the microwave window to the diameter of the tubular conduit section.

7. A level meter for measuring the fill level of a medium in a vessel, with a reference container comprising an additional level meter that can be connected to the vessel in a manner whereby the level in the reference container is identical to that in the vessel, while the reference container is provided with an adapter unit for a microwave level meter operating by the radar principle, wherein the adapter unit incorporates a microwave-signal injection device and the additional level meter is a magnetic level meter in combination with a float.

8. The level meter as in claim 7, wherein the injection device functions as a sealing element for the reference container.

9. The level meter as in claim 8, wherein the reference container is pressure-sealed by means of the injection device.

* * * * *